US010008378B2

(12) United States Patent
Blondia

(10) Patent No.: US 10,008,378 B2
(45) Date of Patent: Jun. 26, 2018

(54) LASER DRIVEN SEALED BEAM LAMP WITH IMPROVED STABILITY

(71) Applicant: Excelitas Technologies Corp., Waltham, MA (US)

(72) Inventor: Rudi Blondia, Fremont, CA (US)

(73) Assignee: Excelitas Technologies Corp., Waltham, MA (US)

( * ) Notice: Subject to any disclaimer, the term of this patent is extended or adjusted under 35 U.S.C. 154(b) by 0 days. days.

(21) Appl. No.: 15/069,242

(22) Filed: Mar. 14, 2016

(65) Prior Publication Data

US 2016/0336168 A1 Nov. 17, 2016

Related U.S. Application Data

(60) Provisional application No. 62/161,389, filed on May 14, 2015.

(51) Int. Cl.
*G01J 5/02* (2006.01)
*G01N 21/05* (2006.01)
(Continued)

(52) U.S. Cl.
CPC .............. *H01J 61/54* (2013.01); *H01J 9/247* (2013.01); *H01J 61/073* (2013.01); *H01J 61/10* (2013.01); *H01J 61/16* (2013.01); *H01J 61/302* (2013.01); *H01J 61/40* (2013.01); *H01J 65/04* (2013.01); *H01J 61/28* (2013.01); *H01J 2893/0063* (2013.01)

(58) Field of Classification Search
CPC .......... H01J 61/54; H01J 61/073; H01J 9/247; H01J 61/302; H01J 61/40; H01J 61/16; H01J 65/04; H01J 61/10; H01J 2893/0063; H01J 61/28
See application file for complete search history.

(56) References Cited

U.S. PATENT DOCUMENTS

| | | | |
|---|---|---|---|
| 3,502,929 | A | 3/1970 | Richter |
| 3,515,491 | A | 6/1970 | Emary |

(Continued)

FOREIGN PATENT DOCUMENTS

| | | |
|---|---|---|
| DE | 243629 | 3/1987 |
| DE | 10 2011 113681 | 3/2013 |

(Continued)

OTHER PUBLICATIONS

I.M. Beterov et al., "Resonance radiation plasma (photoresonance plasma)", Sov. Phys. Usp. 31 (6), 535 (1988).

(Continued)

*Primary Examiner* — Tracie Y Green
(74) *Attorney, Agent, or Firm* — Peter A. Nieves; Sheehan Phinney Bass & Green PA

(57) ABSTRACT

A sealed high intensity illumination device configured to receive a laser beam from a laser light source and method for making the same are disclosed. The device includes a sealed cylindrical chamber configured to contain an ionizable medium. The chamber has a cylindrical wall, with an ingress and an egress window disposed opposite the ingress window. A tube insert is disposed within the chamber formed of an insulating material. The insert is configured to receive the laser beam within the insert inner diameter.

15 Claims, 9 Drawing Sheets

(51) Int. Cl.

| | |
|---|---|
| ***H01J 61/54*** | (2006.01) |
| ***H01J 61/10*** | (2006.01) |
| ***H01J 65/04*** | (2006.01) |
| ***H01J 9/24*** | (2006.01) |
| ***H01J 61/073*** | (2006.01) |
| ***H01J 61/16*** | (2006.01) |
| ***H01J 61/30*** | (2006.01) |
| ***H01J 61/40*** | (2006.01) |
| *H01J 61/28* | (2006.01) |

(56) References Cited

U.S. PATENT DOCUMENTS

| | | | | |
|---|---|---|---|---|
| 3,619,588 | A | 11/1971 | Chambers | |
| 3,808,496 | A | 4/1974 | McRae et al. | |
| 3,826,996 | A | 7/1974 | Jaegle | |
| 3,900,803 | A | 8/1975 | Silfvast et al. | |
| 4,088,966 | A | 5/1978 | Samis | |
| 4,152,625 | A | 5/1979 | Conrad | |
| 4,420,690 | A | 12/1983 | Kuehl | |
| 4,498,029 | A | 2/1985 | Yoshizawa | |
| 4,622,464 | A | 11/1986 | Suktgara et al. | |
| 4,646,215 | A | 2/1987 | Levin | |
| RE32,626 | E | 3/1988 | Yoshizawa | |
| 4,738,748 | A | 4/1988 | Kisa | |
| 4,780,608 | A | 10/1988 | Cross et al. | |
| 4,789,788 | A | 12/1988 | Cox | |
| 4,866,517 | A | 9/1989 | Mochizuki et al. | |
| 4,901,330 | A | 2/1990 | Wolfram | |
| 5,432,398 | A | 7/1995 | Kogelschatz | |
| 5,747,813 | A | 5/1998 | Norton et al. | |
| 5,798,805 | A | 8/1998 | Ooi | |
| 5,905,268 | A | 5/1999 | Garcia et al. | |
| 5,940,182 | A | 8/1999 | Lepper, Jr. et al. | |
| 6,184,517 | B1 | 2/2001 | Sawada | |
| 6,285,743 | B1 | 9/2001 | Hiroyuki | |
| 6,288,780 | B1 | 9/2001 | Fairley et al. | |
| 6,324,255 | B1 | 11/2001 | Kondo et al. | |
| 6,325,255 | B1 | 11/2001 | Hiroyuki | |
| 6,356,700 | B1 | 3/2002 | Strobl | |
| 6,414,436 | B1 | 7/2002 | Eastlund | |
| 6,417,625 | B1 | 7/2002 | Brooks et al. | |
| 6,541,924 | B1 | 4/2003 | Kane et al. | |
| 6,679,276 | B1 | 1/2004 | Brown et al. | |
| 6,737,809 | B2 | 5/2004 | Espiau et al. | |
| 6,762,849 | B1 | 7/2004 | Rulkens | |
| 6,788,404 | B2 | 9/2004 | Lange | |
| 6,956,329 | B2 | 10/2005 | Brooks et al. | |
| 6,960,872 | B2 | 11/2005 | Beeson | |
| 6,972,421 | B2 | 12/2005 | Melnychuk | |
| 7,050,149 | B2 | 5/2006 | Owa et al. | |
| 7,294,839 | B2 * | 11/2007 | Rich | G01N 21/05 250/339.13 |
| 7,295,739 | B2 | 11/2007 | Solarz | |
| 7,307,375 | B2 | 12/2007 | Smith | |
| 7,358,657 | B2 * | 4/2008 | Koelger | G03B 21/16 313/113 |
| 7,390,116 | B2 | 6/2008 | Jain | |
| 7,427,167 | B2 | 9/2008 | Holder et al. | |
| 7,429,818 | B2 | 9/2008 | Chang et al. | |
| 7,435,982 | B2 | 10/2008 | Smith | |
| 7,439,530 | B2 | 10/2008 | Ershov | |
| 7,652,430 | B1 | 1/2010 | Delgado | |
| 7,679,276 | B2 | 3/2010 | Blondia | |
| 7,744,241 | B2 | 6/2010 | Xu | |
| 7,786,455 | B2 | 8/2010 | Smith | |
| 7,989,786 | B2 | 8/2011 | Smith | |
| 8,192,053 | B2 | 6/2012 | Owen et al. | |
| 8,242,671 | B2 | 8/2012 | Blondia et al. | |
| 8,242,695 | B2 | 8/2012 | Sumitomo | |
| 8,253,926 | B2 | 8/2012 | Sumitomo et al. | |
| 8,288,947 | B2 | 10/2012 | Yokota et al. | |
| 8,309,943 | B2 | 11/2012 | Smith | |
| 8,525,138 | B2 | 9/2013 | Smith | |
| 8,969,841 | B2 | 3/2015 | Smith | |
| 9,048,000 | B2 | 6/2015 | Smith | |
| 9,185,786 | B2 | 11/2015 | Smith | |
| 2001/0016430 | A1 | 8/2001 | Nakano | |
| 2001/0035720 | A1 | 11/2001 | Guthrie et al. | |
| 2002/0017399 | A1 | 2/2002 | Chang | |
| 2002/0021508 | A1 | 2/2002 | Ishihara | |
| 2002/0044629 | A1 | 4/2002 | Hertz | |
| 2002/0080834 | A1 | 6/2002 | Kusunose | |
| 2003/0052609 | A1 | 3/2003 | Eastlund | |
| 2003/0068012 | A1 | 4/2003 | Ahmad | |
| 2003/0147499 | A1 | 8/2003 | Kondo | |
| 2003/0168982 | A1 | 9/2003 | Kim | |
| 2003/0231496 | A1 | 12/2003 | Sato | |
| 2004/0016894 | A1 | 1/2004 | Wester | |
| 2004/0026512 | A1 | 2/2004 | Otsubo | |
| 2004/0129896 | A1 | 7/2004 | Schmidt | |
| 2004/0183031 | A1 | 9/2004 | Silverman et al. | |
| 2004/0183038 | A1 | 9/2004 | Hiramoto et al. | |
| 2004/0238762 | A1 | 12/2004 | Mizoguchi et al. | |
| 2004/0264512 | A1 | 12/2004 | Hartlove et al. | |
| 2005/0167618 | A1 | 8/2005 | Hoshino et al. | |
| 2005/0205811 | A1 | 9/2005 | Partlo et al. | |
| 2005/0207454 | A1 | 9/2005 | Staradoumov et al. | |
| 2005/0225739 | A1 | 10/2005 | Hiura | |
| 2005/0243390 | A1 | 11/2005 | Tejnil | |
| 2006/0039435 | A1 | 2/2006 | Cheymol | |
| 2006/0097203 | A1 | 5/2006 | Bykanov et al. | |
| 2006/0109455 | A1 | 5/2006 | Haverlag | |
| 2006/0131515 | A1 | 6/2006 | Partlo | |
| 2006/0152128 | A1 | 7/2006 | Manning | |
| 2006/0192152 | A1 | 8/2006 | Ershov | |
| 2006/0219957 | A1 | 10/2006 | Ershov | |
| 2007/0115468 | A1 | 5/2007 | Barnard | |
| 2007/0228288 | A1 | 10/2007 | Smith | |
| 2007/0228300 | A1 | 10/2007 | Smith | |
| 2007/0285921 | A1 | 12/2007 | Zulim et al. | |
| 2008/0055712 | A1 | 3/2008 | Noelscher | |
| 2008/0280079 | A1 | 11/2008 | Watanabe | |
| 2009/0032740 | A1 | 2/2009 | Smith et al. | |
| 2009/0140651 | A1 | 6/2009 | Hori | |
| 2009/0230326 | A1 | 9/2009 | Vaschenko et al. | |
| 2010/0045197 | A1 | 2/2010 | Kessels | |
| 2010/0181503 | A1 | 7/2010 | Yanagida et al. | |
| 2010/0264820 | A1 | 10/2010 | Sumitomo | |
| 2011/0181191 | A1 | 7/2011 | Smith | |
| 2011/0204265 | A1 | 8/2011 | Smith | |
| 2012/0112624 | A1 | 5/2012 | Jeang | |
| 2013/0329204 | A1 | 12/2013 | Pellemans et al. | |
| 2014/0126043 | A1 | 5/2014 | Senekerimyan | |
| 2014/0362600 | A1 | 12/2014 | Suckling | |
| 2015/0262808 | A1 | 9/2015 | Wang | |
| 2015/0332908 | A1 * | 11/2015 | Blondia | H01J 61/16 313/111 |
| 2016/0025294 | A1 * | 1/2016 | Dijken | H05B 33/0857 362/84 |
| 2016/0057845 | A1 | 2/2016 | Smith | |
| 2016/0351383 | A1 * | 12/2016 | Blondia | H01J 61/16 |

FOREIGN PATENT DOCUMENTS

| | | | |
|---|---|---|---|
| EP | 1335640 | | 8/2003 |
| FR | 2554302 | A | 5/1985 |
| JP | S61-193358 | A | 8/1986 |
| JP | H04-144053 | A | 5/1992 |
| JP | 08299951 | | 11/1996 |
| JP | 2003-317675 | A | 11/2003 |
| JP | 2006010675 | A | 1/2006 |
| NL | 8403294 | | 6/1985 |
| WO | 2004097520 | A2 | 11/2004 |
| WO | WO2007120521 | | 10/2007 |
| WO | WO2010002766 | | 1/2010 |
| WO | 2010093903 | | 8/2010 |

OTHER PUBLICATIONS

D. Keefer, "Laser Sustained Plasmas," Chapter 4, in Radziemski et al., "Laser-Induced Plasmas and Applications," CRC Press (1989).

(56) References Cited

OTHER PUBLICATIONS

Norbert R. Böwering et al., "EUV Source Collector," Proc. of SPIE vol. 6151, (Mar. 10, 2006).
William T. Silfvast, Laser Fundamentals, 2d ed., pp. 1-6 (2004).
Arp et al., Feasibility of generating a useful laser-induced breakdown spectroscopy plasma on rocks at high pressure: preliminary study for a Venus mission, published Jul. 30, 2004.
J. Uhlenbusch and W. Viöl. "Hß-Line Profile Measurements in Optical Discharges", J. Quant. Spectrosc. Radiat. Transfer, vol. 44, No. 1, 47-56 (1990).
Bussiahn, R. et al, "Experimental and theoretical investigations of a low-pressure He—Xe discharge for lighting purpose" Journal of Applied Physics, vol. 95, No. 9, May 1, 2004, pp. 4627-4634.
Beck, Simple Pulse Generator for Pulsing Xenon Arcs with High Repetition Rate, Rev. Sci. Instrum., vol. 45, No. 2, Feb. 1974, pp. 318-319.
Carlhoff, et al, "Continuous Optical Discharges at Very High Pressure," Physica 103C, pp. 439-447.
Fiedorowicz et al, X-Ray Emission from Laser-Irradiated Gas Puff Targets, Appl. Phys. Lett. 62 (22). May 31, 1993.
Franzen, "CW Gas Breakdown in Argon Using 10.6-um Laser Radiation," Appl. Phys. Lett. vol. 21, No. 2 Jul. 15, 1972 pp. 62-64.
Generalov et al "Continuous Optical Discharge," ZhETF Pis. Red. 11, No. 9, May 5, 1970, pp. 302-304.
Jeng et al, Theoretical Investigation of Laser-sustained Argon Plasmas J.Appl.Phys. 60 (7), Oct. 1, 1986 pp. 2272-2279.
Nakar, "Radiometric Characterization of Ultrahigh Radiance Xenon Short-arc Discharge Lamps" Applied Optics, vol. 47 No. 2, Jan. 9, 2008, pp. 224-229.
Moody, "Maintenance of a Gas Breakdown in Argon Using 10.6-u cw Radiation," Journal of Applied Physics, vol. 46 No. 6, Jun. 1975, pp. 2475-2482.
Keefer, et al "Experimental Study of a Stationary Lesser-Sustained Air Plasma", Journal of Applied Physics, vol. 46., No. 3, Mar. 1975, pp. 1080-1083.
Nanometrics, Organic Growth Opportunities for Nanometrics in Process Control, Jan. 2016.
M.J. Soileau et al., Laser-Induced Damage Measurements in CdTe and Other II-VI Materials, Applied Optics, vol. 21, No. 22, pp. 4059-4062; Nov. 15, 1982.
DS004 EQ-10M—Data Sheet, Energetiq, 2005.
John Powell and Claes Magnusson; Handbook of Laser Technologies and Applications vol. III Applications, Part D:1.2, pp. 1587-1611; 2004, published by Institute of Physics Publishing.
Digonnet, Michel J.F., editor; Rare-Earth-Doped-Fiber Lasers and Amplifiers, Second Edition, Revised and Expanded, published by Marcel Dekker, Inc., 2001, pp. 144-170.
Cremers, et al; Evaluation of the Continuous Optical Discharge for Spectrochemical Analysis; Spechtrochimica Acta, Part B. Atomic Spectroscopy; vol. 40B No. 4, 1985.
ASML's customer magazine, 2014, ASML Holding BV.
Raizer, Yuri P.; Gas Discharge Physics, Springer-Verlag 1991; pp. 35-51; 307-310.
Raizer, Yuri P.; Gas Discharge Physics, Springer-Verlag corrected and printing 1997; pp. 35-51; 307-310.
V. P. Zimakov, et al; Interaction of Near-IR Laser Radiation with Plasma of a Continuous Optical Discharge; Plasma Physics Reports, 2016, vol. 42, No. 1, pp. 68-73.
Bezel, et al "High Power Laser-Sustained Plasma Light Sources for KLA-Tencor Broadband Inspection Tool"; Conference Paper • May 2015, KLATencor, Milpitas, California.
Energetiq Technology, Inc.; LDLS™ Laser-Driven Light Source EQ-1000 High Brightness DUV Light Source Data Sheet; 2008; Woburn, Massachusetts.
Rudoy, et al; Xenon Plasma Sustained by Pulse-Periodic Laser Radiation; Plasma Physics Reports, 2015, vol. 41, No. 10, pp. 858-861. Pleiades Publishing, Ltd., 2015.
Knecht, et al; Optical pumping of the XeF(C-+A) and iodine 1.315-pm lasers by a compact surface discharge system; Opt. Eng. 42(12) 3612-3621 (Dec. 2003).
Fridman, et al; Plasma Physics and Engineering; Published in 2004 by Taylor & Francis, pp. 404-419; 618-619.
Model EQ-99 LDLS™ Laser-Driven Light Source; Operation and Maintenance Manual Revision Mar. 2, 2012.
Martin van den Brink; Many ways to shrink: The right moves to 10 nanometer and beyond; Presentation at ASML SmallTalk 2014; London; Nov. 2014.
Laser Pumped Plasma Broadband Light Souce by RnD Isan (no date).
Toumanov; Plasma and High Frequency Processes for Obtaining and Processing Materials in the Nuclear Fuel Cycle; Nova Science Publishers, Inc., New York, 2003, p. 60.
Klauminzer; Cost Considerations for Industrial Excimer Lasers; Laser Focus, The Magazine of Electro-Optics Technology; Dec. 1985.
S. C. Tidwell, ; Highly efficient 60-W TEMoo cw diode-end-pumped Nd:YAG laser; Optics Letters / vol. 18, No. 2 / Jan. 15, 1993, pp. 116-118.
R. J. Shine, Jr; 40-W cw, TEM00-mode, diode-laser-pumped, Nd:YAG miniature-slab laser; Mar. 1, 1995 / vol. 20, No. 5 / Optics Letters; pp. 459-461.
W. Schone, et al; Diode-Pumped High-Power cw Nd:YAG Lasers; W. Waidelich, et al (eds.); Laser in Forschung and Technik; 1996.
Diogiovanni, et al; High Power Fiber Lasers and Amplifiers; Optics & Photonics News, Jan. 1999.
ASML YieldStar T-250D product sheet; ASML Product Catalog; Jan. 20, 2014.
ASML YieldStar S-250D product sheet; SML Product Catalog; Jan. 20, 2014.
Energetiq Technology Inc; Operation manual for LDLS™ Laser-Driven Light Source; Aug. 2009.
Bussiahn; Experimental and theoretical investigations of a low-pressure He—Xe discharge for lighting purpose; Jounral of Applied Physics vol. 95, No. 9 May 1, 2004.
V.P. Zimakov, et al; Bistable behavior of a continuous optical discharge as a laser beam propagation effect; Laser Resonators, Microresonators, and Beam Control XV; vol. 8600, 860002 • © 2013 SPIE.
Fridman, et al; Plasma Physics and Engineering, Second Edition; Published in 2011 by Taylor & Francis, pp. 409-424; 639-640.
Energetiq Technology, Inc.; Model EQ-1500, LDLS™ Laser-Driven Light Source, Operation Manual, May 2011.
Energetiq Technology, Inc.; Model EQ-77 LDLS™ Laser-Driven Light Source Operation Manual, Dec. 2015.
Energetiq Technology, Inc.; Model EQ-90-FC, LDLS™, Laser-Driven Light Source, Operation and Maintenance Manual, Jan. 2014.
Raizer, "Optical discharges," Soviet Physics Uspekhi 23(11) (1980).
Energetiq Technology, Inc.; Operation and Maintenance Manual, Model EQ-99X, LDLS Laser-Driven, Light Source, Rev. 1 (Jan. 2014).
Energetiq Technology, Inc.; Operation and Maintenance Manual, Model EQ-99-FC, LDLS Laser-Driven Light Source, Rev. 2 (Mar. 2012).
Energetiq Technology, Inc.; Operation and Maintenance Manual, Model EQ-99X-FC, LDLS Laser Driven Light Source, Rev. 1 (Jan. 2014).
Energetiq Technology, Inc.; Operation and Maintenance Manual, Model EQ-9-N, LDLS Laser-Driven Light Source, Rev. 6 (Sep. 2015).
Energetiq Technology, Inc.; A presentation titled "EQ-400 LDLS Laser-Driven Light Source," dated Feb. 2, 2015.
A presentation titled "Energetiq Laser-Driven Light Sources," dated Apr. 21, 2015.
A presentation titled "ASML BV LDLS Roadmap," dated Jun. 11, 2013.
Nanometrics, Organic Growth Opportunities for Nanometrics in Process Control.
A presentation titled "LDLS Laser-Driven Light Source," dated Jul. 8, 2011.
Castellano, "Are the Brains at ASML Hurting Investors With High and Ambitious R&D Costs?" Jul. 20, 2015.

(56) References Cited

OTHER PUBLICATIONS

M. W. P. Cann, Light Sources in the 0.15-20-μ Spectral Range, vol. 8 No. 8 Applied Optics (1969).
Kuhn, Kelin; Laser Engineering; Prentice-hall Inc, 1998; pp. 384-440.
Moulton, Peter F.; Tunable Solid-State Lasers; Proceedings of the IEEE, vol. 80, No. 3, Mar. 1992.
Koch, K.K.; Sodium Plasma Produced by Milliwatt cw Laser Irradiation; Journal of the Optical Society of America; vol. 70, No. 6; Jun. 1980.
E. B. Saloman; Energy Levels and Observed Spectral Lines of Xenon, XeI through XeLIV; J. Phys. Chem. Ref. Data, vol. 33, No. 3, 2004.
Lothar Kelin; Measurements of Spectral Emission and Absorption of a High Pressure Xenon Arc in the Stationary and the Flashed Modes; Apr. 1968; vol. 7, No. 4, Applied Optics.
Hailong Zhou, et al; Conductively cooled high-power, high-brightness bars and fiber coupled arrays; High-Power Diode Laser Technology and Applications III, edited by Mark S. Zediker, Proc. of SPIE vol. 5711 (SPIE, Bellingham, WA, 2005).
Ytterbium-doped large-core fibre laser with 1 kW of continuous-wave output power; Y. Jeong, et al; Electronics Letetrs Apr. 15, 2004, vol. 40 No. 8.
H.M. Pask, et al; Ytterbium-Doped Silica Fiber Lasers: Versatile Sources for the 1-1.2 um Region; IEEE Journal of Selected Topics in Quantum Electronics vol. 1, No. 1; Apr. 1993.
Christian Stewen; A 1-kW CW Thin Disc Laser; IEEE Journal of Selected Topics in Quantum Electronics, vol. 6, No. 4, Jul./Aug. 2000.
Hecht, Eugene; Optics, 4ed; Pearson Addison Wesley; 2002; pp. 149-171, 243-273, 385-442.
KLA-Tencor; High Power Laser-Sustained Plasma Light Sources for KLA-Tencor Broadband Inspection Tools; Conference Paper • May 2015.
Davis, Christopher C.; Lasers and Electro-Optics; Fundamentals and Engineering; 1996, Cambridge University Press, pp. 14-35.
Tam, Quasiresonant laser-produced plasma: an efficient mechanism for localized breakdown; J. Appl. Phys. 51(9), Sep. 1980, p. 4682.
Measures, et al; Laser Interaction based on resonance saturation (LIBORS): an alternative to inverse bremsstrahlung for coupling laser energy into a plasma; Applied Optics, vol. 18, No. 11, Jun. 1, 1979.
Eletskii et al; Formation kinetics and parameters of a photoresonant plasma; Sov. Phys. JETP 67 (5); May 1988.
Ballman, et al; Synthetic Quartz with High Ultraviolet Transmission; Applied Optics; Jul. 1968, vol. 7, No. 7.
Energetiq Technology, Inc; LDLS™ Laser-Driven Light Source Data Sheet; 2008.
Patel and Zaidi, The suitability of sapphire for laser windows, MEas. Sci. Technol. 10 (1999).
Waynant, et al; Electro-Optics Handbook, Second Edition; Chapter 10; published by McGraw-Hill, 2000.
Excelitas Technologies Corp.; Cermax® Xenon Lamp Engineering Guide, 2011.
Perkinelmer Optoelectronics; Cermax® Xenon Lamp Engineering Guide, 1998.
G C Wei; Transparent ceramic lamp envelope materials; J. Phys. D: Appl. Phys. 38 (2005) 3057-3065.
PASCO Scientific; Instruction Sheet for the PASCO Model OS-9286A Mercury Vapor Light Source; 1990.
Generalov et al; "Continuous Optical Discharge," ZhETF Pis. Red. 11, No. 9, May 5, 1970, pp. 302-304.
Kozlov et al; "Radiative Losses by Argon Plasma and the Emissive Model of a Continuous Optical Discharge"; Sov. Phys.JETP, vol. 39, No. 3, Sep. 1974, pp. 463-468.
Wilbers et al, "The Continuum Emission of an Arc Plasma," J. Quant. Spectrosc. Radiat. Transfer, vol. 45, No. 1, 1991, pp. 1-10.
Wilbers, et al "The VUV Emissivity of a High-Pressure Cascade Argon Arc from 125 to 200 nm," J.Quant. Spectrosc. Radiat. Transfer, vol. 46, 1991, pp. 299-308.
Luxtell LLC CeraLux Xenon Lamps Product Data Sheet; 2003-2004.
Laufer, Gabriel; Introduction to Optics and Lasers in Engineering; pp. 449-454; Cambridge University Press, 1996.
Yu, et al; LED-Based Projection Systems; Journal of Display Technology, vol. 3, No. 3, Sep. 2007.
Derra et al; UHP lamp systems for projection applications; J. Phys. D: Appl. Phys. 38 (2005) 2995-3010.
Ingle, James D., et al; Spectrochemical Analysis; 1988, Prentice-Hall Inc.; p. 59.
M.J. Solleau et al., Laser-Induced Damage Measurements in CdTe and Other II-VI Materials, Applied Optics, vol. 21, No. 22, pp. 4059-4062.
Roy Henderson et al., Laser Safety, pp, 435-443 (2004).
Turan Erdogan, Ph.D., CTO Semrock, Inc., A Unit of IDEX Corp; letter dated Feb. 28, 2011 regarding Energetiq Technology's EQ-99 system.
Winners of 2010 Prism Awards Announced, Jan. 27, 2011; webpage from photonics.com.
http://www.rdmag.com/award-winners/2011/08/light-source-life-time-lifted-laser-tech; The EQ-99 LDLS Laser-Driven Light Source, produced by Energetiq Technology Inc. 2011.
Energetiq Technology Inc. Press Release: Energetiq Announces Ultra-Compact Light Source for Next Generation HPLC and Advanced Microscopy; Jan. 21, 2010.
KLA-Tencor Launches 2830 and Puma 9500 Series, eDR-5210 | Product Releases | Press Releases; Jul. 13, 2009.
International Search Report for PCT Application No. PCT/US2015/030740 dated Oct. 20, 2015.
Partial International Search Report for PCT Application No. PCT/US2015/030740, dated Aug. 11, 2015, 2 pages.
Excelitas Technologies; Cermax® Xenon Lamp Engineering Guide, Copyright 2011, www.excelitas.com.
Partial Search Report for PCT/US2016/031983 dated Aug. 16, 2016.
International Search Report for PCT/US16/32022, dated Jun. 24, 2016.

* cited by examiner

FIG. 1
(PRIOR ART)
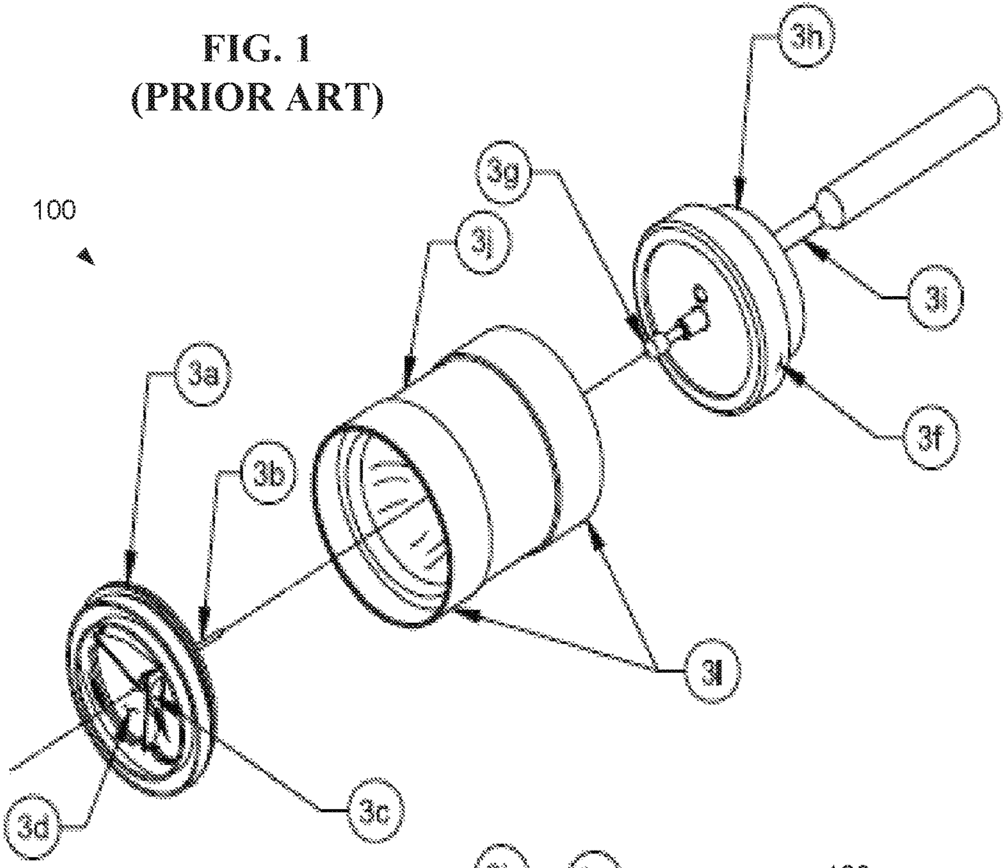
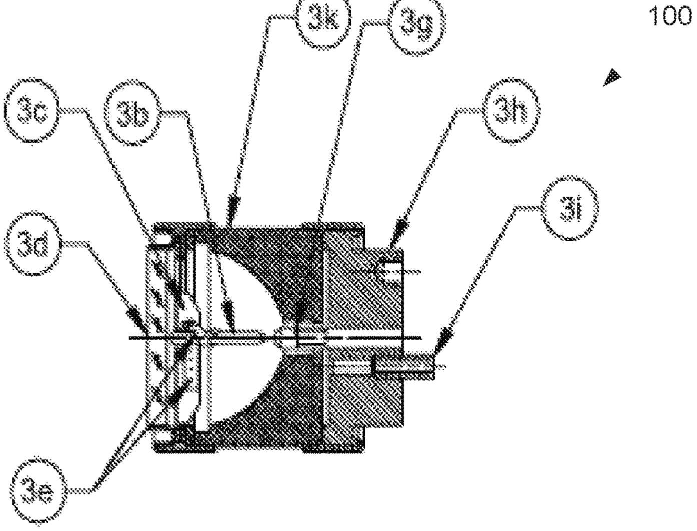
FIG. 2
(PRIOR ART)

LASER DRIVEN SEALED BEAM LAMP WITH IMPROVED STABILITY

CROSS-REFERENCE TO RELATED APPLICATIONS

This application claims the benefit of U.S. Provisional Patent Application Ser. No. 62/161,389, filed May 14, 2015, entitled "Laser Driven Sealed Beam Lamp With Improved Stability," which is incorporated by reference herein in its entirety.

FIELD OF THE INVENTION

The present invention relates to illumination devices, and more particularly, is related to high-intensity arc lamps.

BACKGROUND OF THE INVENTION

High intensity arc lamps are devices that emit a high intensity beam. The lamps generally include a gas containing chamber, for example, a glass bulb, with an anode and cathode that are used to excite the gas (ionizable medium) within the chamber. An electrical discharge is generated between the anode and cathode to provide power to the excited (e.g. ionized) gas to sustain the light emitted by the ionized gas during operation of the light source.

FIG. 1 shows a pictorial view and a cross section of a low-wattage parabolic prior art Xenon lamp 100. The lamp is generally constructed of metal and ceramic. The fill gas, Xenon, is inert and nontoxic. The lamp subassemblies may be constructed with high-temperature brazes in fixtures that constrain the assemblies to tight dimensional tolerances. FIG. 2 shows some of these lamp subassemblies and fixtures after brazing.

Referring to FIG. 1 and FIG. 2, there are three main subassemblies in the prior art lamp 100: cathode; anode; and reflector. A cathode assembly 3*a* contains a lamp cathode 3*b*, a plurality of struts holding the cathode 3*b* to a window flange 3*c*, a window 3*d*, and getters 3*e*. The lamp cathode 3*b* is a small, pencil-shaped part made, for example, from thoriated tungsten. During operation, the cathode 3*b* emits electrons that migrate across a lamp arc gap and strike an anode 3*g*. The electrons are emitted thermionically from the cathode 3*b*, so the cathode tip must maintain a high temperature and low-electron-emission to function.

The cathode struts 3*c* hold the cathode 3*b* rigidly in place and conduct current to the cathode 3*b*. The lamp window 3*d* may be ground and polished single-crystal sapphire (AlO2). Sapphire allows thermal expansion of the window 3*d* to match the flange thermal expansion of the flange 3*c* so that a hermetic seal is maintained over a wide operating temperature range. The thermal conductivity of sapphire transports heat to the flange 3*c* of the lamp and distributes the heat evenly to avoid cracking the window 3*d*. The getters 3*e* are wrapped around the cathode 3*b* and placed on the struts. The getters 3*e* absorb contaminant gases that evolve in the lamp during operation and extend lamp life by preventing the contaminants from poisoning the cathode 3*b* and transporting unwanted materials onto a reflector 3*k* and window 3*d*. The anode assembly 3*f* is composed of the anode 3*g*, a base 3*h*, and tabulation 3*i*. The anode 3*g* is generally constructed from pure tungsten and is much blunter in shape than the cathode 3*b*. This shape is mostly the result of the discharge physics that causes the arc to spread at its positive electrical attachment point. The arc is typically somewhat conical in shape, with the point of the cone touching the cathode 3*b* and the base of the cone resting on the anode 3*g*. The anode 3*g* is larger than the cathode 3*b*, to conduct more heat. About 80% of the conducted waste heat in the lamp is conducted out through the anode 3*g*, and 20% is conducted through the cathode 3*b*. The anode is generally configured to have a lower thermal resistance path to the lamp heat sinks, so the lamp base 3*h* is relatively massive. The base 3*h* is constructed of iron or other thermally conductive material to conduct heat loads from the lamp anode 3*g*. The tabulation 3*i* is the port for evacuating the lamp 100 and filling it with Xenon gas. After filling, the tabulation 3*i* is sealed, for example, pinched or cold-welded with a hydraulic tool, so the lamp 100 is simultaneously sealed and cut off from a filling and processing station. The reflector assembly 3*j* includes the reflector 3*k* and two sleeves 3*l*. The reflector 3*k* may be a nearly pure polycrystalline alumina body that is glazed with a high temperature material to give the reflector a specular surface. The reflector 3*k* is then sealed to its sleeves 3*l* and a reflective coating is applied to the glazed inner surface.

FIG. 3A shows a first perspective of a prior art cylindrical lamp 300. Two arms 345, 346 protrude outward from the sealed chamber 320. The arms 345, 346 house a pair of electrodes 390, 391, which protrude inward into the sealed chamber 320, and provide an electric field for ignition of the ionizable medium within the chamber 320. Electrical connections for the electrodes 390, 391 are provided at the ends of the arms 345, 346.

The chamber 320 has an ingress window 326 where laser light from a laser source (not shown) may enter the chamber 320. Similarly the chamber 320 has an egress window 328 where high intensity light from energized plasma may exit the chamber 320. Light from the laser is focused on the excited gas (plasma) to provide sustaining energy. The ionized media may be added to or removed from the chamber with a controlled high pressure valve 398.

FIG. 3B shows a second perspective of the cylindrical lamp 300, by rotating the view of FIG. 3A ninety degrees vertically. A controlled high pressure valve 398 is located substantially opposite the viewing window 310. FIG. 3C shows a second perspective of the cylindrical lamp 300, by rotating the view of FIG. 3B ninety degrees horizontally. In general, the interior profile of the chamber 320 matches the exterior profile of the chamber 320.

The heated gas may cause some turbulence within the chamber. Such turbulence may affect the plasma region, for example expanding, modulating or deforming the plasma region, or otherwise lead to some instability in the high intensity output light.

A significant amount of instability may be caused by the thermal gradients in the bulb and gravity, causing turbulence in the gas surrounding the plasma. Since the plasma itself typically reaches temperatures over 9,000 k, the surrounding xenon gas sees a significant temperature gradient which in combination with gravity contributes to heavy turbulence. This turbulence affects the spatial stability of the plasma and equally impacts the thermal energy exchange dynamics of the plasma which in turns directly modifies the conversion efficiency of the photons. Therefore, there is a need to address one or more of the above mentioned shortcomings.

SUMMARY OF THE INVENTION

Embodiments of the present invention provide a laser driven sealed beam lamp with improved stability. Briefly described, a first aspect is directed to a sealed high intensity illumination device configured to receive a laser beam from a laser light source and method for making the same are disclosed. The device includes a sealed cylindrical chamber configured to contain an ionizable medium. The chamber has a cylindrical wall, with an ingress and an egress window disposed opposite the ingress window. A tube insert is disposed within the chamber formed of an insulating material. The insert is configured to receive the laser beam within the insert inner diameter.

A second aspect is directed to a sealed high intensity illumination device. The device is configured to receive a laser beam from a laser light source. A sealed chamber is configured to contain an ionizable medium, the chamber having a volumetric profile that is asymmetrical in at least two dimensions. A first electrode and a second electrode extend into the chamber. An ignition position located between the first electrode and the second electrode is offset from at least one point of symmetry within the chamber.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 1 is a schematic diagram of a prior art high intensity lamp in exploded view.

FIG. 2 is a schematic diagram of the prior art high intensity lamp of FIG. 1 in cross-section view.

DETAILED DESCRIPTION

Figure 3A:
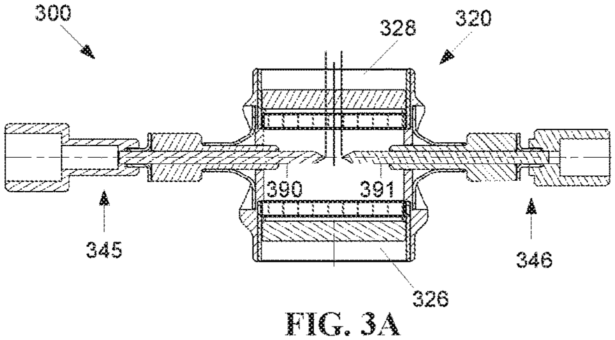
FIG. 3A (PRIOR ART)
FIG. 3A is a schematic diagram of a prior art cylindrical laser driven sealed beam lamp.
Figure 3B:
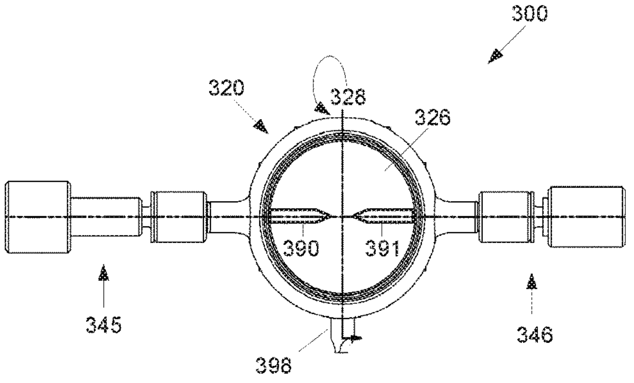
FIG. 3B (PRIOR ART)
FIG. 3B is a schematic diagram of the cylindrical laser driven sealed beam lamp of FIG. 3A from a second view.
Figure 3C:
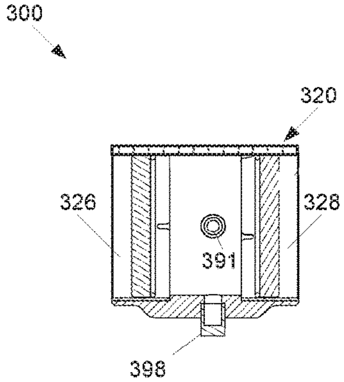
FIG. 3C (PRIOR ART)
FIG. 3C is a schematic diagram of the cylindrical laser driven sealed beam lamp of FIG. 3A from a third view.

The following definitions are useful for interpreting terms applied to features of the embodiments disclosed herein, and are meant only to define elements within the disclosure.

As used within this disclosure, collimated light is light whose rays are parallel, and therefore will spread minimally as it propagates.

As used within this disclosure, "substantially" means "very nearly," or within normal manufacturing tolerances. For example, a substantially flat window, while intended to be flat by design, may vary from being entirely flat based on variances due to manufacturing.

Reference will now be made in detail to embodiments of the present invention, examples of which are illustrated in the accompanying drawings. Wherever possible, the same reference numbers are used in the drawings and the description to refer to the same or like parts.

Figure 4:
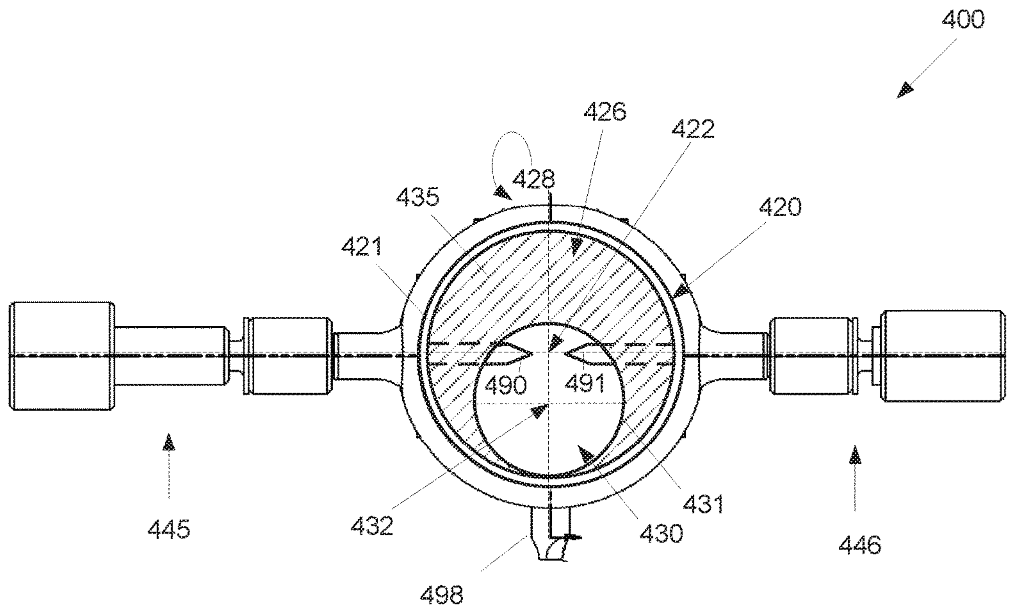
FIG. 4 is a schematic diagram of a first exemplary embodiment of a cylindrical laser driven sealed beam lamp having a chamber with an offset cavity.

FIG. 4 shows a first exemplary embodiment of a laser driven cylindrical sealed beam lamp 400 with an asymmetrical cavity 430. The lamp 400 includes a sealed chamber 420 with the asymmetrical cavity 430 configured to contain an ionizable medium, for example, but not limited to, Xenon, Argon, or Krypton gas. The ionizable medium may be added to or removed from the chamber with a controlled high pressure valve 498.

The chamber 420 has an ingress window 426 which conveys the laser light into the cavity 430, and may be formed of a suitable transparent material, for example quartz glass or sapphire. The chamber 420 is bounded by an exterior wall 421, as well as the ingress window 426 sealing a first side of the chamber 420 and an egress window 428 substantially opposite the ingress window 426 and sealing a second side of the chamber 420. The asymmetrical cavity 430 is formed as a region within the chamber 420, bounded by a cavity wall 431.

A high intensity egress light is output by the lamp 400. The high intensity light is emitted by a plasma formed of the ignited and energized ionizable medium within the cavity 430. The ionizable medium is ignited and/or excited within the cavity 430 at a plasma ignition region located between a pair of ignition electrodes 490, 491 within the cavity 430. The plasma is continuously generated and sustained within the cavity 430 by energy provided by laser light produced external to the chamber 420 and entering the chamber 420 via an ingress window 426. While FIG. 4 shows the ingress and egress windows 426, 428 at the top and bottom of the chamber 420 respectively, other configurations for the ingress and egress windows 426, 428 are possible.

It should be noted that the asymmetrical cavity 430 is asymmetrical with respect to the chamber 420, but may be symmetrical unto itself. The asymmetrical cavity 430 may be, for example, cylindrical in shape, but having a smaller diameter than the chamber 420, where the center 432 of the cavity 430 is offset from the center 422 of the chamber 420. The electrodes 490, 491 may be positioned so that a midpoint between the electrodes 490, 491 is located substantially at the center 422 of the chamber 420, but offset with respect to the center 432 of the cavity 430, such that the midpoint is located near an upper wall (or ceiling) of the cavity 430. As shown by FIG. 4, the midpoint may coincide with the center 422 of the chamber 420. A fill portion 435 fills the portion of the chamber 420 not occupied by the cavity 430. The fill portion 435 may be formed of the same material as the housing for the lamp 400, for example, nickel-cobalt ferrous alloy.

Two arms 445, 446 protrude outward from the sealed chamber 420. The arms 445, 446 house the electrodes 490, 491, which protrude inward into the cavity 430, and provide an electric field for ignition and/or excitation of the ionizable medium within the cavity 430. Only the ends of the electrodes 490, 491 may protrude inward into the chamber 430 from the fill portion 435. Electrical connections for the electrodes 490, 491 are provided at the ends of the arms 445, 446.

Testing has shown that when the laser focus was moved closer to the upper wall of the chamber of a cylindrical lamp, the stability improves. Investigation showed the gas turbulence within the chamber is slowed down and decreased in magnitude by certain geometric chamber arrangements. By forming an offset cavity within the chamber, such arrangements may be formed within a cylindrical lamp configuration.

Therefore, it is desirable to use a cavity that is not symmetrical in horizontal orientation, vertical orientation, and/or depth, but instead to break-up or distribute the turbulent gas stream within the cavity 430 so the energy is dissipated at different rates. The result is that the magnitude of the disturbance is reduced as the energy is distributed over at least two resonant frequencies rather than one. These frequencies may be very close together in light of the overall volume of the cavity 430 but the broadening and flattening of the peaks results in a product that has a higher stability in the long term.

Testing of multiple cavity shapes show the typical 0.1% instability of prior art lamps between 100 Hz and 10 kHz to be reduced by a factor 1.5 to 2 with an asymmetrical cavity, depending on cavity shape and in a lesser extent to overall cavity size.

The most improved shapes were those where the symmetry was broken up in at least two dimensions and provisions were made for the colder gas in the cavity to interact with the hotter gas over a reduced volume, for example a dual parabolic cavity (or "egg shaped") chamber. Locating the plasma away from the center in a lamp breaks up the symmetry, with improved performance when the plasma is located closer to the top of the cavity. Other cavity configurations are also possible, including, but not limited to an offset cavity with lower partial wall to shield the sapphire window, and a cavity with a D profile shape.

The cavity 430 within the chamber 420 is generally pressurized, for example to a pressure level in the range of 20-60 bars. At higher pressures the plasma spot may be smaller, which may be advantageous for coupling into small apertures, for example, a fiber aperture. The chamber 420 has an egress window 428 for emitting high intensity egress light. The egress window 428 may be formed of a suitable transparent material, for example quartz glass or sapphire, and may be coated with a reflective material to reflect specific wavelengths. The reflective coating may block the laser beam wavelengths from exiting the lamp 400, and/or prevent UV energy from exiting the lamp 400. The reflective coating may be configured to pass wavelengths in a certain range such as visible light.

The egress window 428 may also have an anti-reflective coated to increase the transmission of rays of the intended wavelengths. This may be a partial reflection or spectral reflection, for example to filter unwanted wavelengths from egress light emitted by the lamp 400. An egress window 428 coating that reflects the wavelength of the ingress laser light back into the chamber 420 may lower the amount of energy needed to maintain plasma within the chamber 420. The chamber 420 may have a body formed of metal, sapphire or glass, for example, quartz glass.

The laser light source (not shown) may be a single laser, for example, a single infrared (IR) laser diode, or may include two or more lasers, for example, a stack of IR laser diodes. The wavelength of the laser light source (not shown) is preferably selected to be in the near-IR to mid-IR region as to optimally pump the ionizable medium, for example, Xenon gas. A far-IR light source is also possible. A plurality of IR wavelengths may be applied for better coupling with the absorption bands of the gas. Of course, other laser light solutions are possible, but may not be desirable due to cost factors, heat emission, size, or energy requirements, among other factors.

It should be noted that while it is generally taught it is preferable to excite the ionizing gas within 10 nm of a strong absorption line, this is not required when creating a thermal plasma through inverse bremsstrahlung, instead of photoresonance plasma. For example, ionizing gas may be excited CW at 1070 nm, 14 nm away from a very weak absorption line (1% point, 20 times weaker in general than lamps using flourescence plasma, for example, at 980 nm emission with the absorption line at 979.9 nm at the 20% point. However a 10.6 μm laser can ignite Xenon plasma even though there is no known absorption line near this wavelength. In particular, $CO_2$ lasers can be used to ignite and sustain laser plasma in Xenon. See, for example, U.S. Pat. No. 3,900,803.

The lamp 400 may be formed of nickel-cobalt ferrous alloy, also known as Kovar™ without use of any copper in the construction, including braze materials. The use of relatively high pressure within the chamber 420 under the first embodiment provides for a smaller plasma focal point, resulting in improved coupling into smaller apertures, for example, an optical fiber egress.

Under the first embodiment, the electrodes 490, 491 may be separated, for example, by a distance equal to or larger than 1 mm, to minimize the impact of plasma gas turbulence damaging the electrodes 490, 491. The electrodes 490, 491 may be symmetrically designed to minimize the impact on the plasma gas turbulence caused by asymmetrical electrodes.

The electrodes 490, 491 may also be offset with respect to the ingress window 426 and the egress window 428. For example, the electrodes may be positioned so that the ignition location is closer to the ingress window 426 than the egress window 428. Alternatively, the electrodes may be positioned so that the ignition location is closer to the egress window 428 than the ingress window 426.

Figure 5:
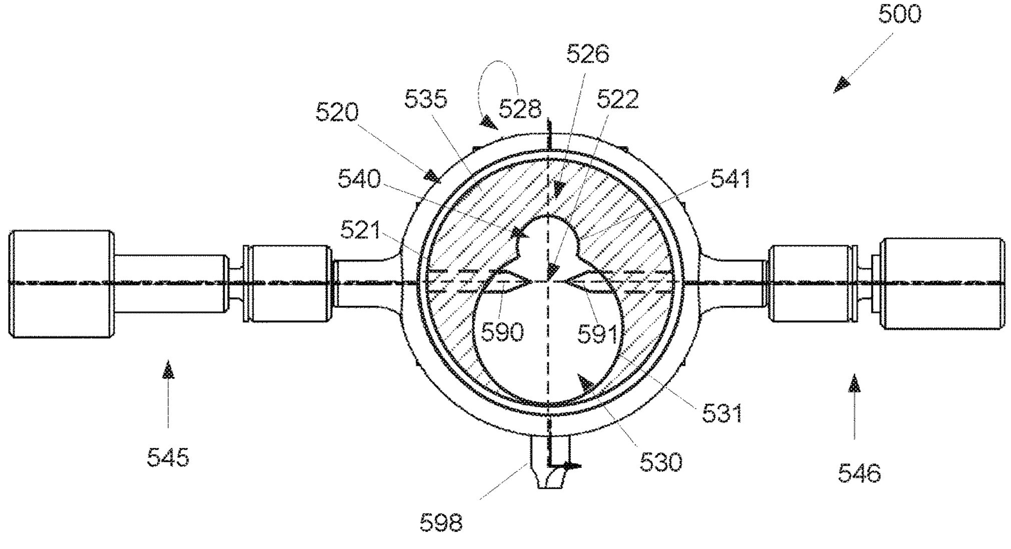
FIG. 5 is a schematic diagram of a second exemplary embodiment of a cylindrical laser driven sealed beam lamp having a chamber with a double cavity.

FIG. 5 shows a second exemplary embodiment of a laser driven cylindrical sealed beam lamp 500 with a dual asymmetrical cavity 530, 540. Like the first exemplary embodiment of a laser driven cylindrical sealed beam lamp 400 the lamp 500 includes a sealed chamber 520 with the asymmetrical cavity 530 configured to contain an ionizable medium. The ionizable medium may be added to or removed from the chamber with a controlled high pressure valve 598. The chamber 520 has an ingress window 526 which conveys the laser light into the cavity 530. The chamber 520 is bound by an exterior wall 521, as well as the ingress window 526 and the egress window 528. The asymmetrical cavity 530 is formed as a region within the chamber 520, bounded by a cavity wall 531. While FIG. 5 shows the ingress and egress windows 526, 528 at the top and bottom of the chamber 520 respectively, other locations and configurations for the ingress and egress windows 526, 528 are possible. For example, in alternative embodiments the ingress window 426 may not be positioned opposite the ingress window 428.

The chamber 520 includes a second cavity 540 partially intersecting a first cavity 530, the second cavity 540 having a walled region 541 within chamber 520 having a second cavity diameter smaller than the first cavity diameter. A fill portion 535 fills the portion of the chamber 520 not occupied by the cavities 530, 540. The fill portion 535 may be formed of the same material as the housing for the lamp 500, for example, nickel-cobalt ferrous alloy.

A high intensity egress light is output by the lamp 500 from a plasma formed of the ignited and energized ionizable medium within the cavity 530. Two arms 545, 546 protrude outward from the sealed chamber 520. The arms 545, 546 house the electrodes 590, 591, which protrude inward into the cavity 530, and provide an electric field for ignition of the ionizable medium within the cavity 530. Electrical connections for the electrodes 590, 451 are provided at the ends of the arms 545, 546.

While FIG. 5 shows the electrodes 590, 591 substantially positioned within the first cavity 530 positioned around a center 522 of the chamber 520, in alternative embodiments the electrodes 590, 591 may be positioned within the second cavity 540, or at an intersection between the first cavity 530 and the second cavity 540.

While the above embodiments have been described in the context of cylindrical lamps, alternative embodiments having pressurized high intensity lamps with offset and/or asymmetrical cavities may include sealed high intensity lamps in non-cylindrical configurations.

As mentioned above, a significant amount of instability may be caused by the thermal gradients in the bulb and gravity, causing turbulence in the gas surrounding the plasma. Accordingly, the following embodiment includes an insulating quartz tube which is inserted in the cylindrical cavity of the lamp.

Figure 6:
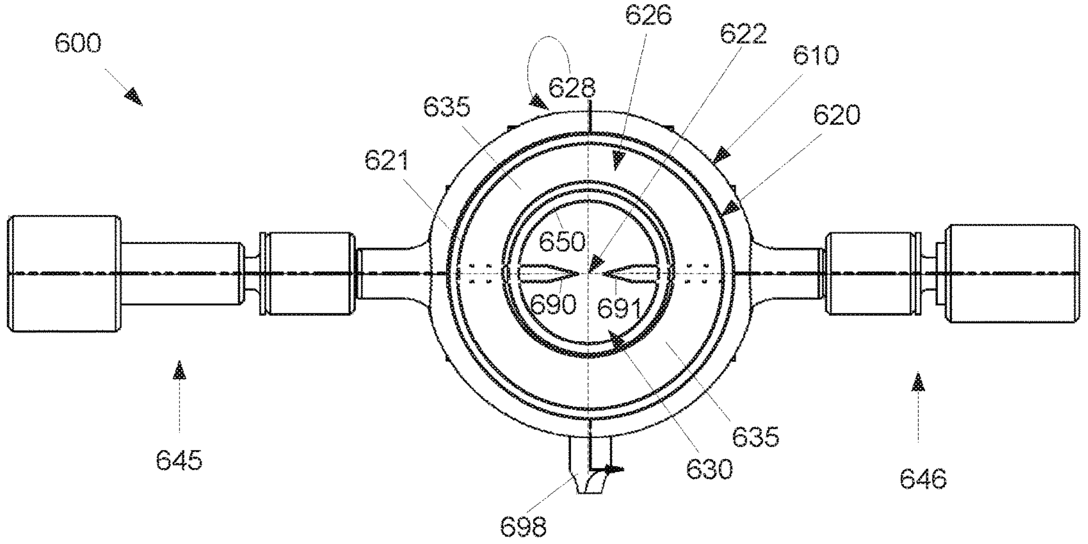
FIG. 6 is a schematic diagram of a third exemplary embodiment of a laser driven cylindrical sealed beam lamp having an insulating insert.
Figure 7:
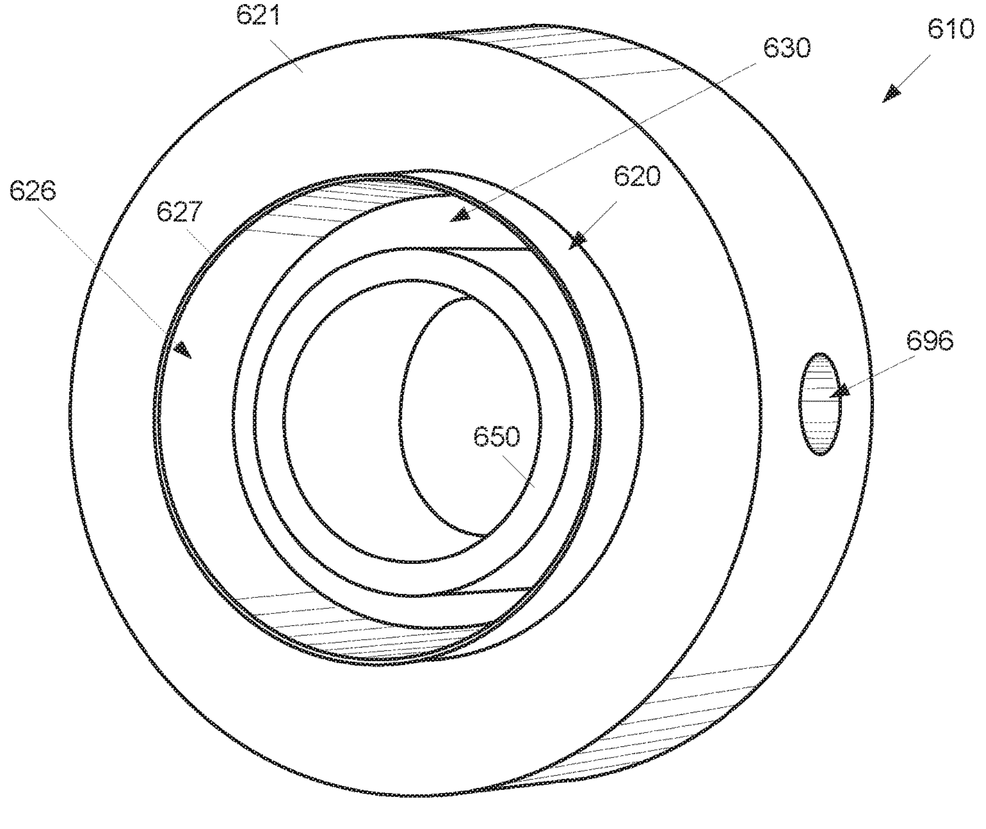
FIG. 7 is a schematic diagram detailing the main body of the lamp of FIG. 6 in a perspective view.
Figure 8:
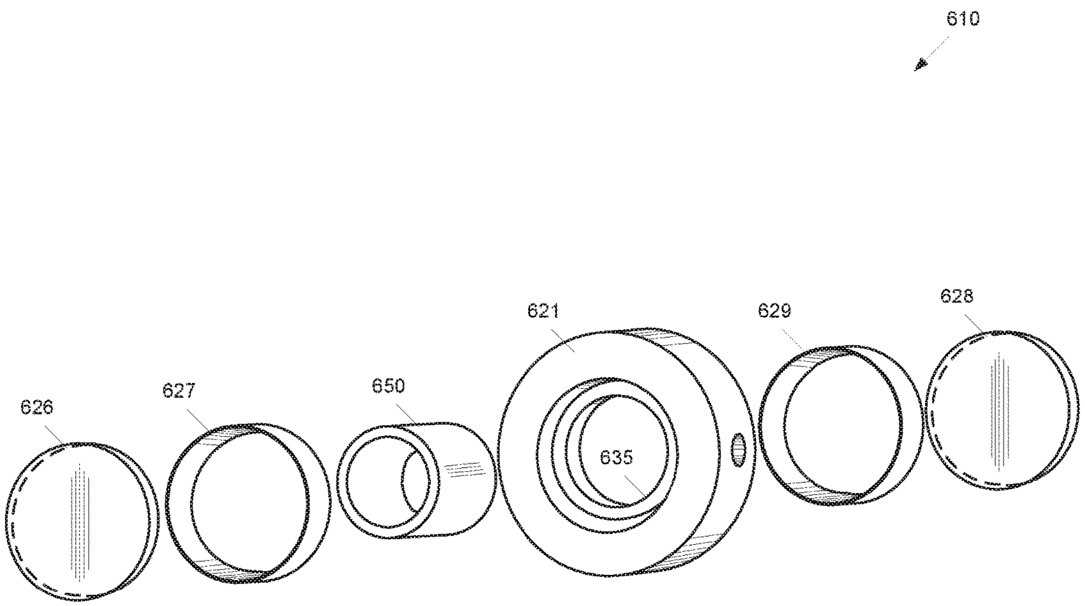
FIG. 8 is an exploded view schematic diagram detailing the main body of the lamp of FIG. 6.

FIG. 6 shows a third exemplary embodiment of a laser driven cylindrical sealed beam lamp 600 having an insulating insert 650. The lamp 600 includes a main body 610, and two arms 645, 646 which protrude outward from the main body 610. The main body 610 includes a sealed chamber 620 around an internal cavity 630. FIG. 7 is a perspective view of the main body 610, with the electrodes 690, 691 and arms 645, 646 omitted for clarity. FIG. 8 shows an exploded view of the main body 610.

The chamber 620 is sealed at an ingress window 626 which conveys laser light into the cavity 630, and the ingress window 626 may be formed of a suitable transparent material, for example quartz glass or sapphire, and framed by an ingress window ring 627. The chamber 620 is bounded by an exterior wall 621, as well as the ingress window 626 and an egress window 628 framed by an egress window ring 629. The cavity 630 is formed as a region within the chamber 620 formed of the exterior wall 621 and the windows 626, 628. The exterior wall 621 may include an optional extending portion 635 which extends at least partially into the chamber 620. The extending portion 635 may be formed of the same material as the main body 610, for example, nickel-cobalt ferrous alloy. A fill port 696 extends from the exterior of the main body 610 into the chamber 620, and is configured to accommodate a controlled high pressure valve 698 for adding or removing an ionizable medium from the chamber 620.

The insulating insert 650 is located within the chamber 620. The insulating insert 650 may be generally cylindrical in shape, although other shapes are possible, as described further below. In particular, the cross section shape of the insulating insert 650 may be circular or non-circular. The walls of the insulating insert 650 extend between the ingress window 626 and the egress window 628. An ingress end of the insulating insert 650 may abut the ingress window 626, such that the ingress end of the insulating insert 650 may be touching or nearly touching the ingress window 626. Likewise, an egress end of the insulating insert 650 may abut the egress window 628, such that the egress end of the insulating insert 650 may be touching or nearly touching the egress window 628. In particular, the insulating insert 650 need not be sealed against the ingress window 626 and/or the egress window 628. Therefore, the insulating insert 650 may move within the chamber 620, and the position of the insulating insert 650 within the chamber 620 may be affected by external forces, such as gravity.

The outside diameter of the insulating insert 650 may typically be smaller than the inside diameter of the cavity 630. For a non-limiting example, the insulating insert 650 may have an 8 mm inner diameter and a 10 mm outside diameter inside a cavity 630 having an 11 mm inside diameter, where the distance from ingress window 626 to the egress window 628 is 8 mm. Other configurations are also possible. For example, distances between windows may preferably be between 4 and 12 mm and cavity diameters may preferably range between 7-19 mm for some applications. For example, the quartz insert wall thicknesses may be between 0.2 and 2 mm.

The insulating insert 650 may be made of quartz, or another suitable insulating material. The material is preferably a thermal isolator with a thermal expansion coefficient that is smaller than the thermal expansion coefficient than the body material of the cavity. Using a material for the insulating insert 650 with a thermal expansion coefficient smaller than the thermal expansion coefficient of the body material ensures the quartz or other thermal isolating material does not crack due to thermo-mechanical stress.

A high intensity egress light is output by the lamp 600. The high intensity light is emitted by a plasma formed of the ignited and energized ionizable medium within the cavity 630 and the insulating insert 650. The ionizable medium is ignited and/or excited within the cavity 630 and the insulating insert 650 at a plasma ignition region located between a pair of active ignition electrodes 690, 691 within the cavity 630 and the insulating insert 650. The arms 645, 646 house the active electrodes 690, 691, which protrude inward into the cavity 630, and provide an electric field for ignition of the ionizable medium within the cavity 630. Electrical connections for the active electrodes 690, 691 are provided at the ends of the arms 645, 646. The active electrodes 690, 691 may protrude though the walls of the insulating insert 650, for example, through openings (not shown) in the walls of the insulating insert 650. Other ignition mechanisms are described below.

Once ignited and/or excited, the plasma is sustained by energy from the laser (external to the lamp 600). The laser is focused upon a location within the insulating insert 650, so that the walls of the insulating insert 650 insulate the walls of the chamber 620 from the heat emitted by the plasma. Since quartz is a good insulator, the ionizable medium, Xenon gas for example, is no longer directly cooled by the walls 621 of the lamp 600 during operation. This greatly reduces the turbulence of the Xenon gas in the lamp 600, in turn reducing the impact of the turbulence on the spatial position of the plasma with a reduced impact on the thermal exchange balance between plasma and surrounding Xenon gas.

The cavity 630 within the chamber 620 is generally pressurized, for example to a pressure level in the range of 20-60 bars. The interior of the insulating insert 650 may not be sealed from the exterior of the insulating insert 650. At higher pressures the plasma spot may be smaller (in volume), which may be advantageous for coupling into small apertures, for example, a fiber aperture. The chamber 620 egress window 628 emits the high intensity egress light. The egress window 628 may be formed of a suitable transparent material, for example quartz glass or sapphire, and may be coated with a reflective material to reflect specific wavelengths. The reflective coating may block the laser beam wavelengths from exiting the lamp 600, and/or prevent UV energy from exiting the lamp 600. The reflective coating may be configured to pass wavelengths in a certain range such as visible light.

The egress window 628 may also have an anti-reflective coated to increase the transmission of rays of the intended wavelengths. This may be a partial reflection or spectral reflection, for example to filter unwanted wavelengths from egress light emitted by the lamp 600. An egress window 628 coating that reflects the wavelength of the ingress laser light back into the chamber 620 may lower the amount of energy needed to maintain plasma within the chamber 620.

Typical instabilities in lamps without an insulating insert measured in a specific measurement are rated as 0.07 to 0.1%, the latter being a cut-off spec limit. In contrast, a lamp 600 equipped with an insulating insert 650 measured in at 0.04% and the VIS light output was visible much more stable to the naked eye judging projected Schlieren effect flumes projected on the wall. The Sapphire window temperature increased by 25%, clearly confirming that the insulating insert 650 increases the internal Xenon temperature in the lamp 600. Further improvements resulted from reducing the internal volume of the lamp and/or removing the electrodes to remove cavity discontinuities. Measurements on a electrodeless lamp with quartz insert have shown the instability drop to below 0.02% with a light output increase of 10% over the no-quartz insert solution at the same Xenon fill pressure.

Figure 9:
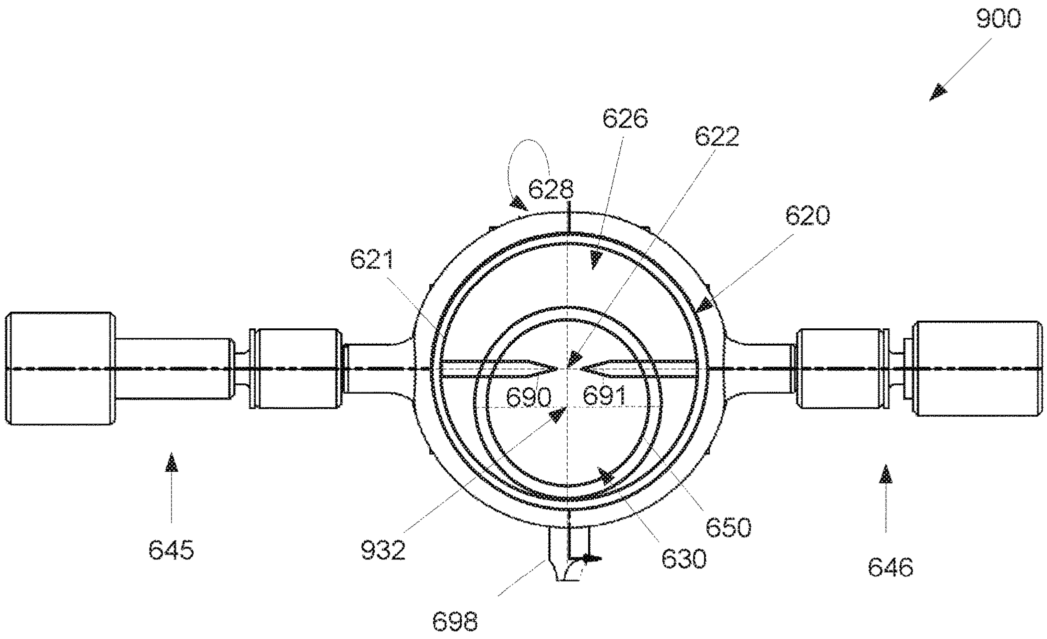
FIG. 9 is a schematic diagram of a fourth exemplary embodiment of a laser driven cylindrical sealed beam lamp having an insulating insert with a center offset from the chamber center.

As shown by FIG. 9, the location of the insulating insert 650 within the cavity 630 may be configured to obtain reductions in turbulence as described above regarding the first embodiment. For example, a fourth embodiment of a lamp 900 substantially similar to the third embodiment may have the center 932 of the cavity 630 offset from the center 622 of the chamber 620, where the plasma sustaining region is configured to be located at the center 622 of the chamber 620. For embodiments with active electrodes or passive non-electrode igniting agents, the electrodes 690, 691 or igniting agents may be positioned so that a plasma sustaining region at a midpoint between the electrodes 690, 691 or igniting agents is located substantially at the center 622 of the chamber 620, but offset with respect to the center 932 of the insulating insert 650, such that the plasma sustaining region is located near an upper wall (or ceiling) of the insulating insert 650. As shown by FIG. 9, the plasma sustaining region may coincide with the center 622 of the chamber 620.

The configuration of the fourth embodiment leaves enough room in the cavity 630 for the pump and fill process to proceed in a similar fashion as with a lamp not including an insulating insert 650. This allows normal operation of the lamp 900 with the plasma is operated closer to the top of the insert 650 than to the bottom, even if the plasma is operated on the cylindrical axis of the chamber 620 as the insulating insert 650 drops to the bottom of the cavity 630.

Figure 10:
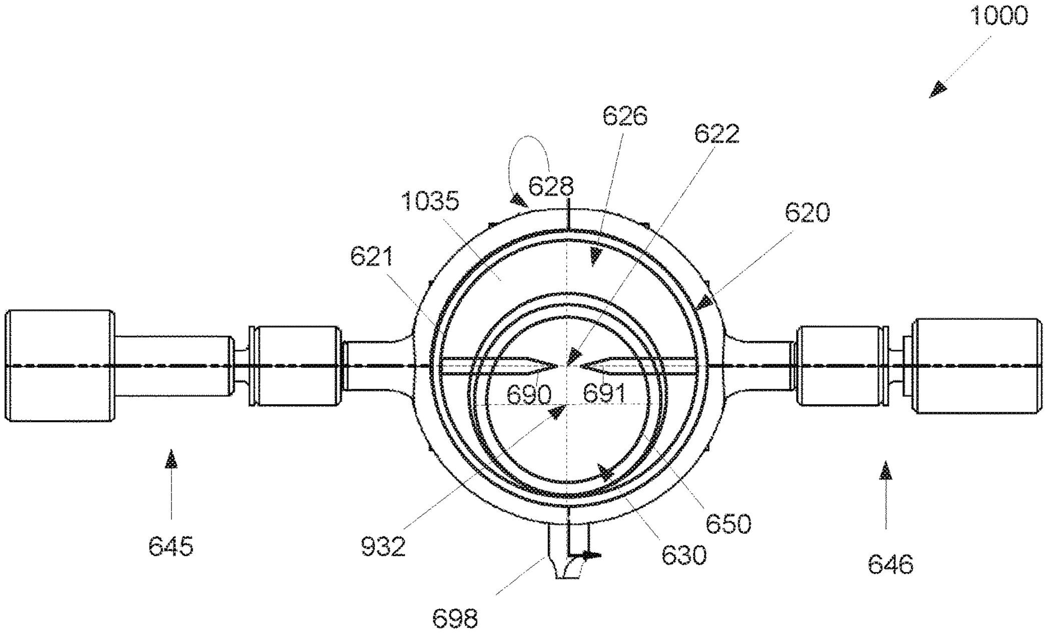
FIG. 10 is a schematic diagram of a fifth exemplary embodiment of a laser driven cylindrical sealed beam lamp similar to the fourth embodiment, including an extending portion of the exterior wall which extends at least partially into the chamber.

FIG. 10 shows a fifth embodiment of a lamp 1000 similar to the fourth embodiment and including an extending portion 1035 of the exterior wall 621 which extends at least partially into the chamber 620. The extending portion 1035 may be formed of the same material as the main body 610, for example, nickel-cobalt ferrous alloy. The extending portion 1035 may have an opening offset from the center 622 of the chamber 620, to assist in positioning the insulating insert 650 in a desired location within the chamber 620. The opening in the extending portion 1035 may be larger than the exterior dimensions of the insulating insert 650, such that the extending portion 1035 is not sealed against the insulating insert 650, thereby allowing free flow of fluid, such as the flow of the ionizable medium is not impeded between the extending portion 1035 and the insulating insert 650. Like the third and fourth embodiments, the insulating insert may not be sealed against the ingress window 626 and/or the egress window 628 to similarly allow for free flow of the ionizable medium within and without the insulating insert 650.

Figure 11:
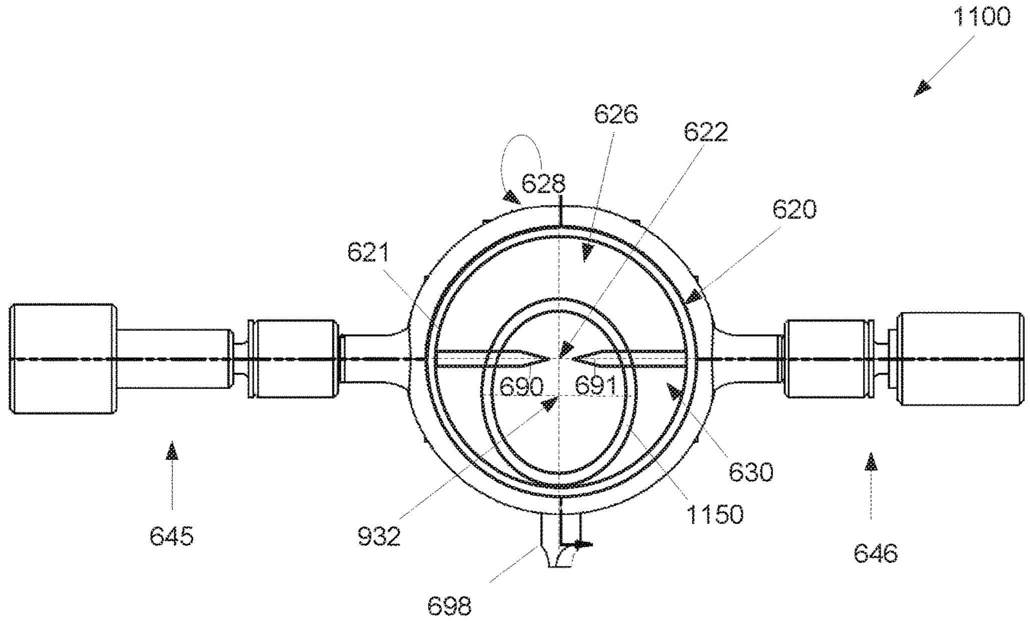
FIG. 11 is a schematic diagram of a sixth exemplary embodiment of a laser driven cylindrical sealed beam lamp having an asymmetrical insulating insert.

FIG. 11 shows a sixth exemplary embodiment of a laser driven cylindrical sealed beam lamp 1100 having an asymmetrical insulating insert 1150. Under the sixth embodiment, the insulating insert may have a non-circular cross section. For example, the symmetry may be broken up in at least two dimensions providing for the colder gas in the cavity to interact with the hotter gas over a reduced volume, such as a dual parabolic cavity (or "egg shaped") chamber. As with earlier embodiments, locating the plasma away from the center in a lamp breaks up the symmetry, with improved performance when the plasma is located closer to the top of the cavity. Other insert shape configurations are also possible, including, but not limited to an insert with lower partial wall to shield the sapphire window, and an insert with a D profile shape. However, such insert shapes may add significantly to the cost of manufacturing the lamp.

Figure 12:
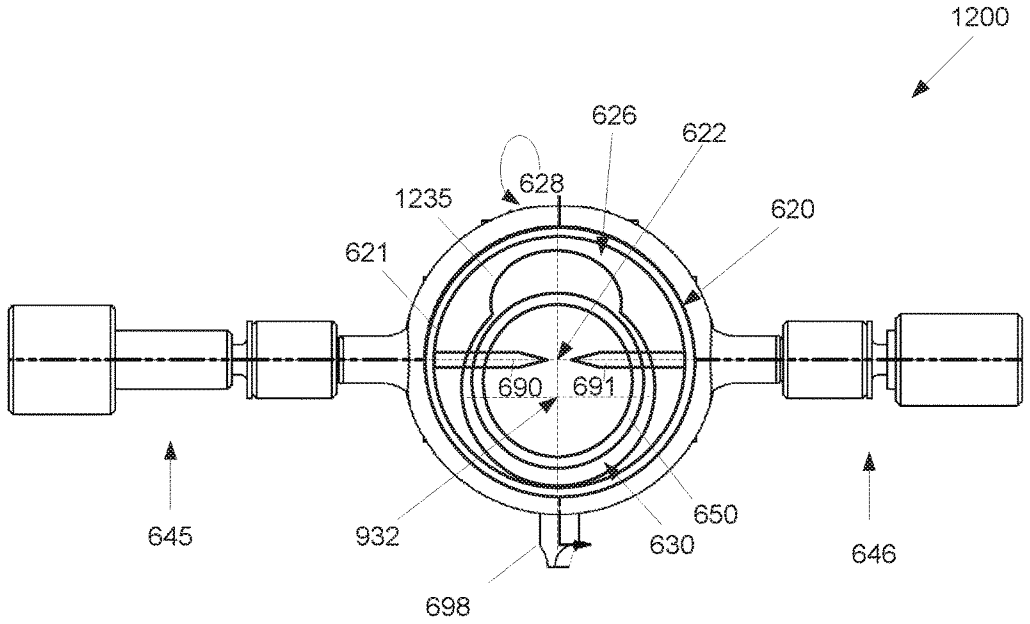
FIG. 12 is a schematic diagram of a seventh exemplary embodiment of a cylindrical laser driven sealed beam lamp having a chamber with a double cavity and insulating insert.

FIG. 12 shows a seventh exemplary embodiment of a cylindrical laser driven sealed beam lamp 1200 having a chamber with a double cavity 1235 and insulating insert 630. The seventh embodiment combines the chamber shape of the second embodiment with the insulating insert 650 of the third through sixth embodiments. The insulating insert 650 may have a circular cross section, as per the third embodiment or may have an asymmetrical cross section, as per the sixth embodiment. The plasma sustaining location may be chosen according to the needs of a particular lamp. For example, the plasma sustaining location may be located central to the double cavity 1235, central to the insert 650, or offset from the center of either or both of the double cavity 1235 and the insert 630.

Figure 13:
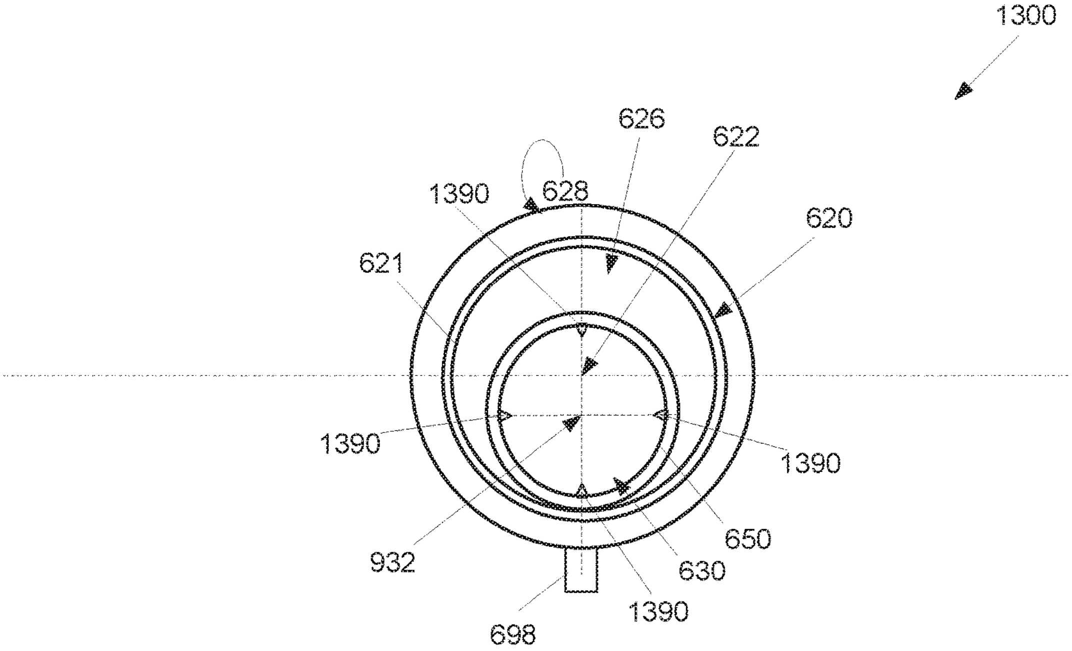
FIG. 13 is a schematic diagram of an eighth exemplary embodiment of a cylindrical laser driven sealed beam lamp having one or more passive non-electrode igniting agent used in place of active electrodes.

In an eighth embodiment of a lamp 1300, as shown in FIG. 13, one or more passive non-electrode igniting agents 1390 may be used to ignite/excite the ionizable medium within the chamber instead of active electrodes 690, 691 (FIG. 6), as described by co-pending U.S. patent application Ser. No. 14/712,304 entitled "Electrodeless Single CW Laser Driven Xenon Lamp," which is incorporated by reference herein in its entirety. The insulating insert 650 may have passive non-electrode igniting agents 1390 incorporated into the insulating insert 650, for example, embedded in the insulating insert 650, or attached to the inside and/or outside of the insulating insert 650. The electrodes 690, 691 (FIG. 6) and arms 645, 646 (FIG. 6) of previous embodiments may be omitted. For example, in alternative embodiments that omit both electrodes and passive non-electrode igniting agents 1390, the ionizable medium within the chamber may be ignited/excited entirely via energy from the external laser.

An exemplary embodiment of an insulating insert 650 may include an embedded or inset ring of a copper/tungsten MIM construct, with inwardly pointing non-electrode igniting agents 1390 (pins) of thoriated tungsten, for example, two or 4 evenly spaced non-electrode igniting agents 1390 pointing to a plasma ignition region within the insulating insert 650. As mentioned previously, other alternative embodiments of the lamp 1300 may omit electrodes entirely, such that the ionizable medium is ignited/excited directly by the laser.

For the previous embodiments (other than the third embodiment), the location of the plasma sustaining location relative to the center of the chamber (first and second embodiments) or insulating insert (fourth through seventh embodiments) generally has an impact on plasma stability. For example, in a lamp with a cavity/insert having an inner diameter on the order of 10 mm, the plasma sustaining location is preferably at least 2 to 3 mm away from the cavity/insert wall. Any closer to the wall and the plasma may extinguish. A positive impact on plasma stability may be noticed as soon as the plasma sustaining location is moved 1 to 2 mm from the center axis of the cavity/insert. The exact distances are relative to the size of the cavity/insert, and are based on the thermal streams in the lamp based on the cooling of the ionizable medium when the ionizable medium hits the cavity walls. The plasma sustaining location may be positioned according to the stability and/or illumination needs of the application at hand. The plasma may initially be ignited and/or excited at a first location, for example, centered between electrodes or passive non-electrode igniting elements, and then relocated to a second location for sustaining high intensity light, for example, by slowly moving the focus location of the laser from the first location to the second location.

Other embodiments are also possible. While the drawings generally depict lamp embodiments with active electrodes, in alternative embodiments, each of the previously described lamp embodiments using active electrodes may instead be configured with passive non-electrode igniting agents or may omit electrodes entirely. In such embodiments, the arms 445, 446 (FIG. 4), 545, 546 (FIG. 5), and 645, 646 (FIGS. 6, 9-12) may be omitted. For other alternative embodiments, instead of having an insulating insert spaced apart from the chamber wall, the chamber walls of the lamp may be lined with an insulating material, such as quartz. With such embodiments, one or more openings may be provided across the tabulation to have the pump-and-fill process work, and/or to provide access for active electrodes into the chamber.

Figure 14:
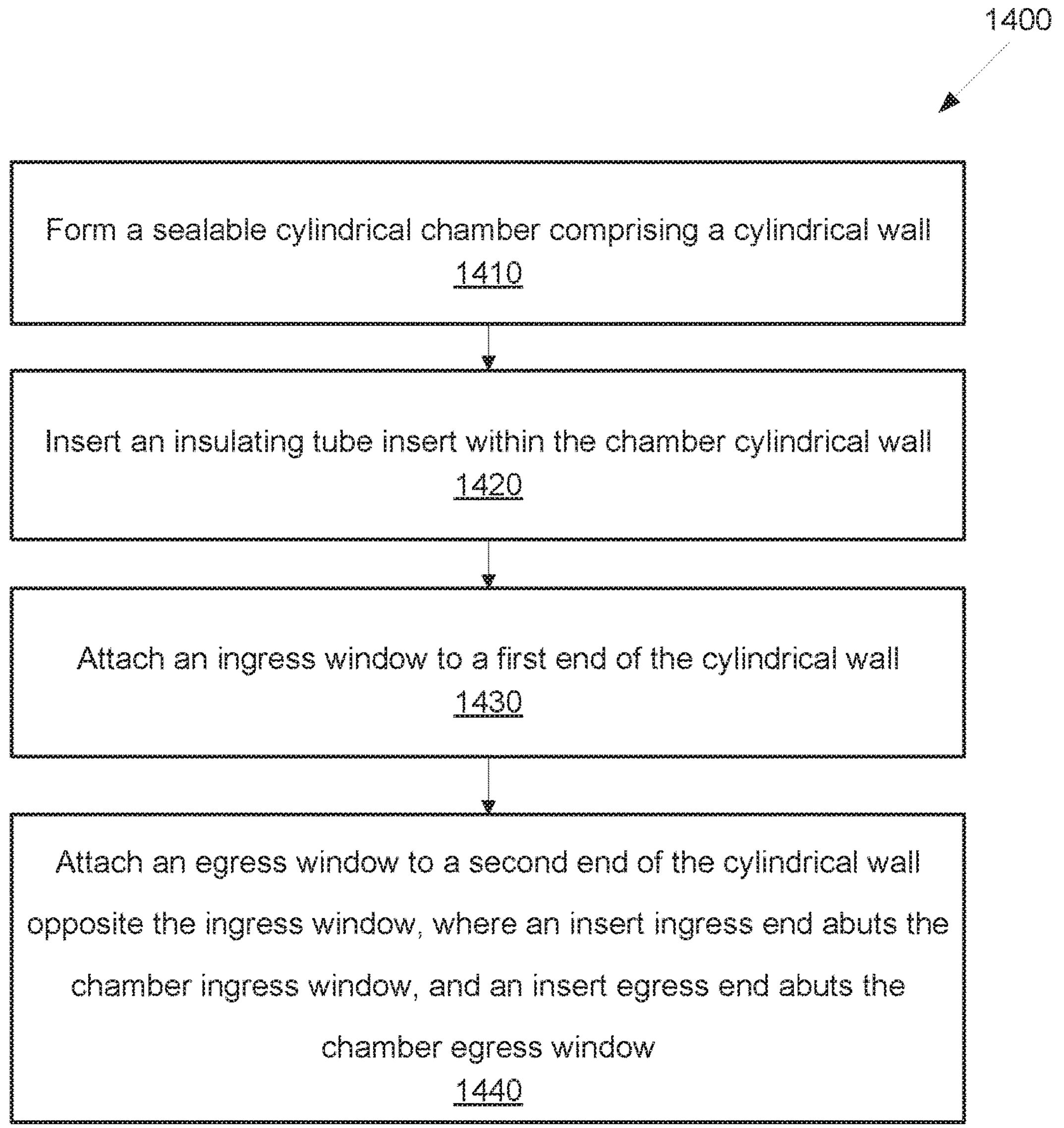
FIG. 14 is a flowchart illustrating a method for manufacturing a sealed high intensity illumination device configured to receive a laser beam from a laser light source.

FIG. 14 is a flowchart 1400 illustrating a method for manufacturing a sealed high intensity illumination device configured to receive a laser beam from a laser light source. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A sealable cylindrical chamber 620 (FIG. 6) comprising a cylindrical wall 621 (FIG. 6) is formed, as shown by block 1410. An insulating tube insert 650 (FIG. 6) is inserted within the chamber cylindrical wall 621 (FIG. 6), as shown by block 1420. An ingress window 626 (FIG. 6) is attached to a first end of the cylindrical wall 621 (FIG. 6), as shown by block 1430. An egress window 628 (FIG. 6) is attached to a second end of the cylindrical wall 621 (FIG. 6) opposite the ingress window 626 (FIG. 6), as shown by block 1440, where an insert 650 (FIG. 6) ingress end abuts the chamber ingress window 626 (FIG. 6), and an insert 650 (FIG. 6) egress end abuts the chamber egress window 628 (FIG. 6).

In summary it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sealed high intensity illumination emitting device configured to receive a laser beam from a laser light source, the device comprising:

a sealed cylindrical chamber configured to contain an ionizable medium, the chamber comprising and bounded by a cylindrical wall with an inner diameter, an ingress window transparent to a first wavelength range and an egress window disposed opposite the ingress window transparent to a second wavelength range;

a tube insert disposed within the chamber formed of an insulating material comprising a walled region separating an insert interior portion from an insert exterior portion, an ingress end abutting the chamber ingress window, and an egress end abutting the chamber egress window, wherein the insert is configured to receive the laser beam within the insert inner diameter.

2. The device of claim 1, wherein a cross section shape of the insert is circular comprising an insert outer diameter, and an insert inner diameter, and the insert outer diameter is smaller than the chamber inner diameter.

3. The device of claim 1, wherein the insulating material comprises quartz.

4. The device of claim 1, wherein the insert is configured to allow the ionizable medium to flow between the insert interior portion and the insert exterior portion.

5. The device of claim 1, further comprising:

a first electrode extending into the insert interior portion through a first insert side aperture; and a second electrode extending into the insert interior portion through a first insert side aperture substantially opposite the first electrode.

6. The device of claim 1, further comprising a passive non-electrode igniting agent incorporated into the insulating insert.

7. The device of claim 1, wherein the ingress window and egress window are each formed from a material selected from a group consisting of quartz glass and sapphire.

8. The device of claim 1, wherein the sealed chamber body comprises nickel-cobalt ferrous alloy.

9. The device of claim 1, wherein the sealed chamber body comprises sapphire and/or quartz.

10. The device of claim 1, wherein ionizable medium is selected from the group consisting of Xenon gas, Argon gas, and Krypton gas.

11. The device of claim 1, wherein the egress window comprises a coating of a reflective material configured to reflect a specific range of wavelengths.

12. The device of claim 1, wherein the egress window comprises a coating of a material configured to pass a specific range of wavelengths.

13. The device of claim 1, further comprising a wall extending portion protruding into the chamber from the chamber cylindrical wall, wherein the insert is disposed within the wall extending portion.

14. The device of 13, wherein the wall extending portion comprises a circular cross section shape comprising a center axis which is offset from a center axis of the chamber cylindrical wall.

15. The device of 13, wherein the wall extending portion comprises a non-circular cross section shape.

* * * * *